UNITED STATES PATENT OFFICE.

JAMES M. HOWARD, OF BOSTON, MASSACHUSETTS.

COMPOSITION FOR PRESERVING PLANTS.

SPECIFICATION forming part of Letters Patent No. 689,807, dated December 24, 1901.

Application filed February 8, 1901. Serial No. 46,469. (No specimens.)

*To all whom it may concern:*

Be it known that I, JAMES M. HOWARD, a citizen of the United States, residing at Boston, in the county of Suffolk and State of Massachusetts, have invented new and useful Improvements in Compositions for Preserving Plants, of which the following is a specification.

This invention relates to a new and useful composition of matter to be used as a preservative for natural and artificial plants.

My composition consists of about one ounce of gum-tragacanth dissolved in about half a gallon of water. With this solution I mix about a teaspoonful of pistachio and a teaspoonful of eau-de-cologne. The above ingredients are thoroughly stirred and intermixed, after which the composition is ready for use.

In using the composition I apply it with a wet sponge to the leaves of the natural or artificial plants, by which such leaves are preserved.

What I claim, and desire to secure by Letters Patent of the United States, is—

1. A composition of matter for preserving natural and artificial plants, consisting of gum-tragacanth, pistachio, and eau-de-cologne.

2. The herein-described composition of matter for preserving natural and artificial plants, consisting of gum-tragacanth dissolved in water, pistachio and eau-de-cologne.

3. The herein-described composition of matter for preserving natural and artificial plants, consisting of one ounce of gum-tragacanth dissolved in a half-gallon of water, a teaspoonful of pistachio and a teaspoonful of eau-de-cologne, substantially as herein described and for the purpose specified.

In testimony whereof I have hereunto set my hand in presence of two subscribing witnesses.

JAMES M. HOWARD.

Witnesses:
ALBAN ANDRÉN,
CHARLES E. MAXWELL.